United States Patent Office 3,790,461
Patented Feb. 5, 1974

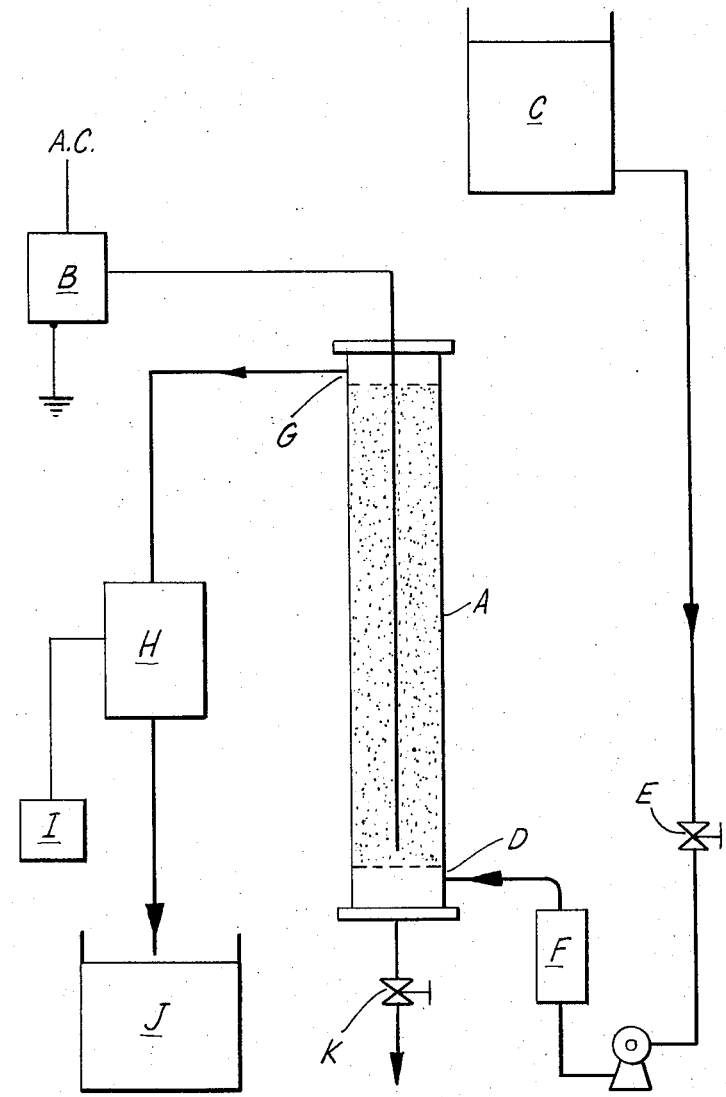

3,790,461
SEPARATION OF A LIQUID CONTAINING CHARGED PARTICLES OR/AND POLARIZABLE MOLECULES
George C. Yeh, Willistown Township, Chester County, Pa. (Smedley Drive, R.D. 1, Newtown Square, Pa. 19073)
Filed May 20, 1971, Ser. No. 145,527
Int. Cl. B01k 5/00
U.S. Cl. 204—180 R       10 Claims

ABSTRACT OF THE DISCLOSURE

When a liquid containing charged particles, such as ions, electrolytes, free radicals and colloids or/and molecules having polar or/and polarizable properties is brought into contact with an electrostatically charged surface, a double layer of said charged particles or/and said molecules may be formed at said surface. Separation of said charged particles or/and said molecules from said liquid can be accomplished if said liquid in the bulk is replaced from said electrostatically charged surface, after the contacting.

---

This invention relates to a method and apparatus for separating a liquid containing charged particles, such as ions, electrolytes, free radicals and colloids or/and molecules having polar or/and polarizable properties by employing an applied electrostatical potential (either positive or negative) as the driving force for separation. It is particularly concerned with the method and apparatus for separating said charged particles or/and said molecules comprising the steps of bringing said liquid into intimate contact with a solid, preferably a finely divided particulate matter, inducing the formation of a double layer of said charged particles or/and said molecules by an applied electrostatic charge to said solid, and then replacing said liquid in the bulk from said solid or vice versa. Said finely divided particulate matter may preferably be packed in a bed, permitting said liquid to flow through the bed to facilitate intimate contacting with said liquid. After having saturated with said charged particles or/and said molecules, said bed may be regenerated by turning off said applied electrostatic charge and then letting said charged particles or/and said molecules that are held within said double layer or layers be drained with said liquid from said bed. No disposal problem of a secondary stream exists in the separation method provided by the present invention.

Electrical energy has been used for separation of liquids containing various forms of charged particles, for many years. The separation methods using electrical energy as a driving force include: electrolysis, electrodialysis, electrophoresis and cation- and anion-responsive electrodes process, etc. It is important to not that in every known electrical method of separation, the charged particles contained in the liquid are always selectively replaced by the applied current flowing across a pair of electrodes, viz., cathode and anode, according to their polarities. Therefore, the rate of removal or separation is dependent upon the current that is flowing across said pair of electrodes.

But, in the separation method provided by the present invention, said charged particles or/and said molecules form double layers at and near the surface of said electrostatically charged particulate matter after having replaced themselves from the liquid bulk, and are held within these double layers until the applied electrostatic charge is turned off; and they are not selectively separated according to their polarities, as is being done in every known separation method using electrical energy. In the separation method provided by the present invention, no current should be flowing through said liquid during the entire operation; and the only power requirement other than that needed for pumping the liquid would involve only the very limited amount of electrical energy that is needed to maintain the desired electrostatic charge (either positive or negative) on the surface of said particulate matter. The rate and efficiency of separation by the present invention are not proportional to the applied electrostatical potential, as may be seen from the examples given below. The above described characteristics of the separation method provided by the present invention are the important and unique features of this invention.

Unlike all the known electrical separation methods, the present invention involves no faradaic processes; and therefore, neither gases nor other forms of products are formed within the system during the separation operation by the present invention. Furthermore, the difficulties brought up by the solute build-up at the membrane front or by the great resistance to the current flowing through a dilute solution that are common to all the known electrical methods do not exist in the separation method provided by the present invention.

The results of extensive experimental study have shown that the rate and efficiency of separation by the present invention are extremely high; and complete separation of liquids containing charged particles or/and polarizable molecules at any concentration is not only practicable but very simple and economical. According to the experimental results obtained, the following general trends seem to apply very well to the separation by the present invention involving various aqueous and organic solutions of more than twenty-five different electrolytes and of twelve polarizable molecules:

(1) The separation efficiency (ratio of the amount of solute removed to the total solute contained in the feed solution that had been passed before the breakthrough point was reached) is higher when a lower electrostatical potential is applied.

(2) To obtain the same fractional separation, a higher electrostatical potential is required when a lower feed concentration is used.

(3) The complete separation can be obtained regardless of the feed concentration if enough amount of particulate matter is used in a continuous contacting operation.

(4) The electrostatical potential range that normally brings the desirable separation results is in between several millivolts and several hundreds volts, depending mainly on the feed solution concentration.

(5) The smaller the size of the particulate matter and the closer the distance between said particulate matter, the higher the fractional separation per single pass.

(6) Liquid channeling, by-passing and back-mixing always lower the fractional separation per single pass.

(7) The liquid flow rate has a little effect, if any, upon the separation efficiency.

(8) The valency of the ionic species may affect the separation efficiency; the higher the valency, the higher the separation efficiency. The dielectric constant of the solute to be removed seems to have the same effect.

(9) When the particulate matter in the bed is completely saturated with the solutes and no further separation is obtained, the liquid drained from said bed (after having turned off the applied electrostatic charge) is usually in or near saturation with said solutes.

The double layer formation for a stationary solution has been proven beyond any doubt; but its formation and retention on a charged surface in a moving solution has not been clearly demonstrated, previously. This inventor has found experimentally that a double layer can be retained within a viscous liquid film adjacent to a charged surface placed in a moving solution. Since for most of the liquids the magnitude of the effective thickness of a viscous liquid film is approximately $1/100$ cm. and the magnitude of the effective thickness of a double layer is usually much less than $3/100$ cm., the retention of a double layer within a viscous film at a charged surface in a moving solution is quite practicable.

In a packed bed of electrostatically charged particulate matter, the magnitude of the average dimension of pore spaces is approximately equal to the average size of the particulate matter packed. Therefore, if the average size of the particulate matter packed in a bed were less than the effective thickness of double layers formed, then the pore spaces of the bed may be considered to be completely filled with double layers. Therefore, the charged particles in the solution passing through the packed bed of particulate matter having an average size less than the effective thickness of the double layers that have been formed by an applied electrostatical potential would have little chance to leak through the bed without being caught and held within said double layers. Since a bed would be saturated by the charged particles from the solution inlet-end, the depth of said bed can play an important role in determining the fractional separation of solution per single pass.

To summarize that already described above, it may be said that the present invention has several unique and desirable features as a separation method, namely: (1) very rapid and complete separation, (2) negligible power requirements as compared to all the known electrical separation methods, (3) instantaneous and complete regeneration of the separation column, (4) no secondary stream disposal problems, (5) extremely simple apparatus and operational procedure, (6) great flexibility and applicability, suitable for separating practically any liquid containing charged particles or/and polarizable molecules at any concentration.

Because of the unique features described above, the present invention should be particularly attractive in purifying, separating, diluting or concentrating electrolyte solutions, in desalination of sea water, in water quality control, in liquid-waste treatment, and as an analytical technique for liquids and liquid solutions.

Nowhere in the literature is there any report on the use of double layer formation brought up by an applied electrostatical charge to the surface of a particulate matter suspended in a liquid or packed in a bed to facilitate the continuous contact between said liquid and said electrostatically charged particulate matter and to effect the separation of the charge particles or/and polarizable molecules contained in said liquid. The filtration of a dissolved electrolyte or/and polarizable molecules from their solution freely flowing through an electrostatically charged bed of particulate matter has not been feasible previously.

According to the present invention there are a number of preferable ways by which a liquid containing charged particles or/and polarizable molecules may be brought into intimate contact with electrostatically charged particulate matter to effect the separation of said charged paricles or/and said polarizable molecules from said liquid.

Examples are:

(1) A finely divided pariculate matter may be suspended in said liquid containing charged particles or/and polarizable molecules by slow mechanical agitation of said liquid to facilitate intimate contact between the two; said particulate matter is electrostatically charged by an applied electrostatical potential (positive or negative) using a suitably designed electrode placed in said liquid. Following this contacting operation, said particulate matter may be allowed to settle or filter out said liquid. This method is a batch-wise operation.

(2) Said finely divided particulate matter may be fluidized by said liquid in a bed which is charged by an applied electrostatical potential using a suitably designed electrode. A part of said particulate matter in the bed may be allowed to leave said bed with the effluent of said liquid; and the removed particulate matter is then separated from said liquid effluent by filtration or settling. This method provides a true continuous operation, since the removed particulate matter may be regenerated and returned to the system continuously.

(3) Said finely divided particulate matter may be packed in a deep bed allowing said liquid to freely flow through the bed while it is charged by an applied electstatical potential using a suitably designed electrode. All the charged particles or/and polarizable molecules in said liquid will be brought into intimate contact with said particulate matter while said liquid is passing through the narrow port spaces of said bed, and are attracted by the applied electrostatic charge at the surface of said particulate matter, forming a double layer around each particulate matter and thus filtering out said liquid. This method may be called "Ion Filtration" since it operates as the ordinary filtration does. Because of the above described reasons, this particular method of separation provided by the present invention has been found most desirable. It can be carried out in the manner of a cyclic operation. The complete cycle including the filtration and the bed-regeneration can be carried out in the same apparatus by simply turning on the applied electrostatic charge for filtration and turning the same off for bed-regeneration. Like the ordinary filtration, liquid-channeling, by-passing and back-mixing within the packed-bed can lower the separation efficiency. It has also been found experimentally that the application of too high an electrostatic potential to the bed can cause an intensive repulsion between the particulate matter packed in bed and results in dispersion of liquid, causing poor separation.

In the above methods (1) and (2), the particulate matter removed from the system may be regenerated in a separate apparatus by either washing away the solute held on to it or by charging it with an applied electrostatical potential, preferably of the polarity opposite to that used for contacting.

EXPERIMENTAL

Numerous experimental runs have been carried out successfully by employing various solid-liquid contacting methods including the three methods described above. The separation method (3) described above has been found most desirable; a typical experimental system employed and several typical experimental runs are described below.

Referring to FIG. 1, the flow-sheet of a typical experimental system used, a Pyrex-glass column (A) is packed with graphite powder (97% pass through a #325 Taylor Screen) to a depth of 24 in.; an electrostatic charge of the desired polarity and voltage can be applied to said bed from a D.C. power supply (B) through an electrode wire inserted into the entire depth of said bed; the other terminal having the opposite polarity is grounded, and the bed is completely insulated from the ground. A feed solution containing charged particles or/and polarizable molecules of the desired concentration is fed to said column (A) from a tank (C) through the inlet (D) located near the bottom of said column; the flow rate is controlled by a valve (E) and read by a rotameter (F). After having passed across the entire depth of said graphite bed, the solution leaves said column from the outlet (G) located near the top of said column, and its concentration is analysed by an automatic analytical instrument (H), such as conductivity analyser, pH analyser or any suitable chemical analyser, and recorded continuously by a recorder (I); the effluent is then led to a receiving tank (J). When the effluent concentration indicates that the breakthrough point has been reached within said bed and the graphite powder has been saturater with the solute the feeding of solution is stopped and the applied electrostatic charge is then turned off; the liquid contained in the bed is then drained completely from the bed through the outlet valve (K). The entire procedure described above is repeated to continue a continuous cyclic operation. When a true continuous operation was desirable, two or more filtration columns were used; therefore, at least one column is always turned on to permit a continuous flow of liquid when others are turned off for bed-regeneration.

For each experimental run, the separation efficiency per single pass of liquid was determined by the simple graphical integration of the concentration-time curve and material balance. The power requirement for each run could only be shown by the wattage needed to operate the power supply used to apply the electrostatic charge since the current flowing from the power supply to the experimental system was so negligible that it was not possible to detect using a most accurate micro-ammeter and micro-wattmeter for all the runs made in a range of the applied electrostatical potential (relative to the ground) between zero and ±60,000 volts. All the experimental runs were made at 25° C.

The results of several experimental runs for separating aqueous electrolyte solutions and solutions of organic compounds having different dielectric constants are given in the following examples to demonstrate the separation characteristics of the present invention.

EXPERIMENT 1.—SEPARATION OF SODIUM CHLORIDE SOLUTIONS

| Run 1 | | Run 4 | | Run 17 | |
|---|---|---|---|---|---|
| Feed concentration, 200 p.p.m. Voltage applied, −250 v. (DC). Feed rate, 5,500 ml./min./sq.ft. | | Feed concentration, 500 p.p.m. Voltage applied, −100 v. (DC). Feed rate, 5,500 ml./min./sq.ft. | | Feed concentration, 1,000 p.p.m. Voltage applied, −50 v. (DC). Feed rate, 5,500 ml./min./sq.ft. | |
| Time (min.) | Conc. (p.p.m.) | Time (min.) | Conc. (p.p.m.) | Time (min.) | Conc. (p.p.m.) |
| 0 | 200 | 0 | 500 | 0 | 1,000 |
| 5 | 130 | 5 | 160 | 5 | 650 |
| 10 | 100 | 10 | 160 | 10 | 560 |
| 15 | 60 | 15 | 170 | 15 | 460 |
| 20 | 40 | 20 | 175 | 20 | 460 |
| 25 | 30 | 25 | 180 | 35 | 560 |
| 30 | 25 | 40 | 130 | 50 | 510 |
| 35 | 29 | 45 | 120 | 65 | 510 |
| 40 | 20 | 50 | 135 | 80 | 560 |
| 60 | 30 | 60 | 120 | 95 | 560 |
| 80 | 25 | 65 | 130 | 110 | 560 |
| 100 | 29 | 75 | 130 | 125 | 560 |
| 120 | 38 | 85 | 180 | 140 | 625 |
| 140 | 40 | 100 | 130 | 155 | 625 |
| 160 | 35 | 105 | 130 | 170 | 625 |
| 180 | 35 | 110 | 180 | 185 | 650 |
| 200 | 30 | 115 | 190 | 190 | 700 |
| 220 | 30 | 125 | 210 | 195 | 800 |
| 240 | 35 | 135 | 250 | | |
| 260 | 38 | 140 | 270 | | |
| 289 | 38 | 145 | 300 | | |
| 300 | 30 | 150 | 500 | | |

The average minimum concentration of the effluent in each run was used to determine the maximum fractional separation per single pass of liquid and the separation efficiency before the breakthrough point. For Run #1, the maximum fractional separation of 90% and the separation efficiency of 86% were obtained; for Run #4, the maximum fractional separation of 74% and the separation efficiency of 65% were obtained; for Run #17, the maximum fractional separation of 55% and the separation efficiency of 45% were obtained. The above results indicate that if the depth of graphite bed were made three times as great as that used, a feed solution of 1,000 p.p.m. NaCl would have been completely separated into NaCl and water. The solutions drained from the bed during the bed regeneration were in or near saturation for Run #4 and Run #17, but not for Run #1, which had been discontinued before the bed breakthrough point was actually reached. The wattage of the power supply used for each run was 45 watts. It is interesting to note that the small flunctuation in the effluent concentration obtained may have been caused by some nonideal flows of liquid within the bed of graphite, viz., channeling, by-passing and back-mixing, etc., as already described above.

EXPERIMENT 2.—SEPARATION OF ORGANIC SOLUTIONS OF POLARIZABLE MOLECULES

| Run #P-1 | | Run #P-5 | | Run #P-A7 | |
|---|---|---|---|---|---|
| Feed solution, 5,000 p.p.m. of nitrobenzene in toluene. Voltage applied, +100 v. (DC). Feed rate, 40 ml./min./sq. in. | | Feed solution, 5,000 p.p.m. of nitrobenzene in toluene. Voltage applied, −100 v. (DC). Feed rate, 40 ml./min./sq. in. | | Feed solution, 5,000 p.p.m. of nitrobenzene in toluene. Voltage applied, 110 v., 60 cycles (AC). Feed rate, 40 ml./min./sq. in. | |
| Time (min.) | Conc. (p.p.m.) | Time (min.) | Conc. (p.p.m.) | Time (min.) | Conc. (p.p.m.) |
| 0 | 5,000 | 0 | 5,000 | 0 | 5,000 |
| 10 | 4,200 | 10 | 4,300 | 10 | 4,800 |
| 20 | 3,500 | 20 | 3,900 | 20 | 4,600 |
| 30 | 3,100 | 30 | 3,400 | 30 | 4,600 |
| 40 | 2,900 | 40 | 3,000 | 40 | 4,500 |
| 50 | 2,700 | 50 | 2,700 | 50 | 4,300 |
| 60 | 2,600 | 60 | 2,800 | 60 | 4,100 |
| 70 | 2,500 | 70 | 2,700 | 70 | 4,000 |
| 80 | 2,500 | 80 | 2,700 | 80 | 3,900 |
| 100 | 2,500 | 100 | 2,800 | 100 | 3,800 |
| 120 | 2,800 | 110 | 2,800 | 120 | 4,000 |
| 140 | 3,100 | 130 | 3,100 | 140 | 4,200 |
| 160 | 3,400 | 150 | 3,500 | 150 | 4,400 |
| 170 | 3,900 | 170 | 3,900 | 170 | 4,300 |
| 180 | 4,300 | 180 | 4,400 | | |

The maximum fractional separation for the above three runs, #P-1, #P-5, #P-A7 were 50%, 46% and 24% respectively; the corresponding separation efficiencies were 44%, 41% and 20% respectively. In an alternating field the molecules experience the polarization resulting from both the permanent dipole moment and the induced dipole. The induced polarization is due to a shifting of electrons, which will oscillate instantaneously with the field, whereas the polarization resulting from the permanent dipole moment involves both rotation and migration of molecules. The rate of migration may be slowed down by their rotational motion; and this effect may account for the lower separation efficiency obtained for Run #P-A7.

It is obvious from the above example illustration and discussion that liquids containing charged particles or/and molecules having polar or/and polarizable properties can be separated by bringing said liquid into intimate contact with finely divided particulate matter while applying an electrostatc charge to said particulate matter to form double layers of said charged particles or/and said molecules having polar or/and polarizable properties, and then replacing remaining liquid in the bulk from said particulate matter. Said electrostatic charge may be applied using either DC or AC power source; and the power requirement is very small and not significantly greater than that required for running the power supply used, provided that the liquid separation system is electrically insulated from the ground. The optimum electrostatical potential to be applied will mainly depend on the concentration of solution and the valency or the dielectric constant of the solute to be separated. In general, the higher the valency or the dielectric constant, the lower the electrostatical potential required; also the higher the concentration, the lower the potential needed for the same separation results desired.

It will be understood that this invention includes separation of all the liquids containing any sort of charged particles or/and molecules having polar or/and polarizable properties, as long as a double layer or layers of said charged particles or/and said molecules having polar or/and polarizable properties are formed at the surface of a solid by the induction of an applied electrostatic charge to said solid, in order to facilitate their separation from their mother liquid. The induction of the double layer formation, a nonfaradaic process, is the key to separation of liquid by the present invention. Therefore, the occurrence of any faradaic process, i.e., electrolysis, electrodialysis, electrophoresis, and electroplating, etc. should be prevented in the separation method provided by the present invention.

Having thus described my invention of what I claim as new and desire to secure by Letters Patent is:

1. Method for treating a liquid containing substances including charged particles or/and molecules having polar or/and polarizable properties which are capable of being attracted by an electrostatic charge and the resultant electrostatic field, said method comprising: (A) intimately contacting said liquid, in a contact zone electrically capable of containing an applied electrostatic charge, and in the absence of a flow of electric current within said contact zone, with a finely divided solid conductor carrying an applied electrostatic charge thereby to induce the adherence of at least a layer of said substances on said solid conductor by means of the applied electrostatic charge; and (B) separating from said solid conductor a liquid having a reduced concentration of said substances.

2. Method according to claim 1, wherein said solid conductor is in the form of finely divided particulate matter.

3. The method of claim 2 wherein said contacting of said liquid with said particulate matter is accomplished by agitation to suspend said particulate matter in said liquid.

4. The method of claim 2 wherein said contacting of said liquid with said particulate matter is accomplished by flow of said liquid through a bed of said particulate matter to fluidize said particulate matter.

5. The method of claim 2 wherein said contacting of said liquid with said particulate matter is accomplished by transporting said particulate matter through said liquid.

6. The method of claim 2 wherein said contacting of said liquid with said particulate matter is accomplished by permitting said liquid to flow through a bed of said particulate matter.

7. The method of claim 2 wherein said particulate matter, after contacting by said liquid and separation of a liquid having reduced concentration of said substances, is regenerated by discontinuing said applied electrostatic charge and separating said substances adhering to said particulate matter.

8. The method of claim 1 wherein a negative electrostatic charge is applied to said solid conductor.

9. The method of claim 1 wherein a positive electrostatic charge is applied to said solid conductor.

10. The method of claim 1 wherein an electrostatic charge of alternatingly negative and positive polarities is applied to said solid conductor.

References Cited

UNITED STATES PATENTS

| | | | |
|---|---|---|---|
| 799,605 | 9/1905 | Lester | 204—149 |
| 1,038,122 | 9/1912 | Hagg | 204—149 |
| 2,428,329 | 9/1947 | Ham et al. | 204—180 R |
| 2,563,903 | 8/1951 | Zadra | 204—109 |
| 3,457,152 | 7/1969 | Maloney, Jr. et al. | 204—131 |
| 3,616,356 | 10/1971 | Roy | 204—152 |
| 2,914,453 | 11/1959 | Wennerberg | 204—186 |
| 3,304,251 | 2/1967 | Walker et al. | 204—184 |
| 3,544,441 | 12/1970 | Griswold | 204—186 |
| 3,655,550 | 4/1972 | Davies | 204—302 |

FOREIGN PATENTS

| | | | |
|---|---|---|---|
| 648,201 | 1/1951 | Great Britain | 204—149 |

OTHER REFERENCES

Le Goff et al.: "Applications of Fluidized Beds in Electrochemistry," Indust. and Engin. Chem., vol. 61, No. 10, October 1969, pp. 8–17.

JOHN H. MACK, Primary Examiner

A. C. PRESCOTT, Assistant Examiner

U.S. Cl. X.R.

204—186, 149